(12) United States Patent
Bonn et al.

(10) Patent No.: US 7,006,611 B2
(45) Date of Patent: Feb. 28, 2006

(54) INTERFACE FOR A TELECOMMUNICATION SYSTEM

(75) Inventors: Michael Brian Bonn, Somonauk, IL (US); Ravi Ravichandran, Naperville, IL (US)

(73) Assignee: Comnet International, Co.,, Lisle, IL (US)

( * ) Notice: Subject to any disclaimer, the term of this patent is extended or adjusted under 35 U.S.C. 154(b) by 171 days.

(21) Appl. No.: 10/036,658

(22) Filed: Dec. 21, 2001

(65) Prior Publication Data

US 2003/0118161 A1  Jun. 26, 2003

(51) Int. Cl.
*H04M 11/00* (2006.01)
(52) U.S. Cl. ............................... 379/93.31; 379/88.13; 370/242; 370/252; 714/4
(58) Field of Classification Search .. 379/32.01–32.09, 379/229, 88.02, 221.03, 221.13, 279, 292, 379/88.17, 93.08, 93.28–93.32, 289; 370/252, 370/217, 242; 709/227; 714/4
See application file for complete search history.

(56) References Cited

U.S. PATENT DOCUMENTS

| | | | |
|---|---|---|---|
| 5,022,070 A | | 6/1991 | Forson et al. |
| 5,255,314 A | * | 10/1993 | Applegate et al. ........... 379/229 |
| 5,978,450 A | * | 11/1999 | McAllister et al. ...... 379/88.02 |
| 6,134,671 A | * | 10/2000 | Commerford et al. ......... 714/4 |
| 6,278,688 B1 | * | 8/2001 | Suutari et al. ............... 370/217 |
| 6,625,273 B1 | * | 9/2003 | Ashdown et al. ....... 379/221.13 |
| 6,678,369 B1 | * | 1/2004 | DeMent et al. ......... 379/221.03 |
| 6,798,749 B1 | * | 9/2004 | Lehto .......................... 370/242 |
| 2002/0051425 A1 | * | 5/2002 | Larsson ...................... 370/252 |
| 2002/0156896 A1 | * | 10/2002 | Lin et al. .................... 709/227 |

* cited by examiner

*Primary Examiner*—Fan Tsang
*Assistant Examiner*—Md Shafiul Alam Elahee
(74) *Attorney, Agent, or Firm*—Trexler, Bushnell, Giangiorgi, Blackstone & Marr, Ltd.

(57) ABSTRACT

An improved interface is provided for transmitting data messages between a telephone switching system and an adjunct processor. The interface hardware includes multiple connectors for connecting the interface to the telephone switching system and a single connector for connecting the interface to an adjunct processor. The interface software provides multiple transmission links for processing and transmitting the data messages between the telephone switching system and the adjunct processor. The multiple links provided by the interface of the present invention result in a system with improved performance and reliability.

2 Claims, 8 Drawing Sheets

FIG. 4A

ISDN DRIVER (Interrupt Service Routine)

If the Cause of Interrupt IS A New frame received

Receive the frame from 5ESS switch through the hardware in a temporary buffer
    Test for its integrity
    If it is a good frame Forward it to the Protocol Stack, else discard it End If If the Cause of Interrupt IS Link Deactivated Reset the protocol stack Link_Deactivated=TRUE End If If the Cause of Interrupt IS Link Activated AND Link_Deactivated=TRUE Link_Activated=FALSE
    Power up the protocol stack End If

FIG. 4B

PROTOCOL STACK

The protocol stack consists of three sub-layers each implementing the data link, network and transportation layer of the protocol. Each layer does the following processing FOREVER
1. Wait for a 5E Frame.
2. Determine if the frame is a control packet or a data packet.
3. If it is a control packet
   a. Send an appropriate response (varies for error Control, flow control, link integrity checking etc.,) to the lower layer.
   b. Based on the type of the control packet, take the stack to a different state.
4. If the received packet is a data packet without errors AND the stack is in Data Transfer State, forward it to the upper layer of the stack. (Upper layer for the three sub-layers will be network layer, transportation layer and splitting task).
END FOREVER

FIG. 4C

SPLITTING TASK:

FOREVER
       1. Read the message from the protocol stack.
       2. Split the message into individual call messages.
       3. Forward it to the application task.
END FOREVER

FIG. 4D

APPLICATION TASK:

FOREVER
       1. Read the message delivered by the Splitting Task.
       2. Translate the message from the 5ESS format to 1AESS format.
       3. Deliver it to the VMS through the RS232 Hardware.
END FOREVER

FIG. 4E

APPLICATION TASK:

FOREVER
    1. Receive the message from the VMS through the RS232 hardware.
    2. Translate the message from the 1AESS format to the 5ESS format.
    3. Forward it to the COMBINING TASK.
END FOREVER

FIG. 4F

COMBINING TASK:

LinkToBeSent=1

FOREVER

Receive The Message from the Application and Combine Them

If both the links are in a working condition

Send the Combined Message to the stack corresponding to Link indicated by LinkToBeSent If LinkToBeSent=0 then LinkToBeSent=1 else LinkToBeSent=0

End if

If one of the links is failed, send it to the stack corresponding to the healthy link.

End FOREVER

FIG. 4G

PROTOCOL STACK

Stands Blocked until the protocol stack is in the DATA TRANSFER STATE.

FOREVER

Wait for a Message from the COMBINING TASK

Receive in a temporary buffer and Append Control Information to the translated message.

Forward it to the ISDN Device Driver

END FOREVER

FIG. 4H

ISDN DRIVER (Interrupt Service routine)

IF the cause of the Interrupt is "Ready for Transmission"

If the input message queue has any message
        Transmit it to the 5ESS Switch through the hardware
    End If
End If

INTERFACE FOR A TELECOMMUNICATION SYSTEM

BACKGROUND OF THE INVENTION

This invention is generally directed to an improved interface for use in connection with a telecommunication system. A telecommunication system often includes a telephone switching system and an adjunct processor such as a voice messaging system (VMS).

The telephone switching system processes messages from multiple telephones and their users. These messages are often further processed and stored in the VMS.

Messages in the telecommunication system are comprised of a voice component and a data message component. The voice component relates to the voice message which has been recorded and the data component identifies information, such as, where the call originated, the destination of the call, and the time of the call. The present invention relates only to the processing of the data component of the messages.

A problem which is often encountered in a telecommunication system is that the telephone switching system utilizes a different protocol than the adjunct processor. A protocol is a set of rules governing the format of data which is exchanged between microprocessors. Two types of protocols, for example, are Application Processor Interface (API) and Simplified Message Service Interface (SMSI). In order for data messages to be forwarded from the telephone switch to the adjunct processor, the microprocessor within the adjunct processor must recognize the protocol of the data messages from the telephone switch. Likewise, in order for data messages to be forwarded from the adjunct processor to the telephone switch, the microprocessor within the telephone switch must recognize the protocol of the data messages from the adjunct processor. Often however, telecommunication switches and adjunct processors do not utilize the same protocol. For example, many switches operate using API protocol and many VMS operate using SMSI protocol. In order for the VMS and the telecommunication switch to operate together an interface (or protocol converter) is needed to convert the API protocol messages delivered from the switch to SMSI protocol. Once the data is formatted in SMSI protocol, the data can be utilized by the VMS. Similarly, the data delivered from the VMS is converted from SMSI protocol to API protocol so that it may be utilized by the switch.

In the past, interfaces have been used to accomplish the translation of data messages between telephone switches and VMS. A number of problems, however, have been encountered when these interfaces are implemented. First, the number of messages which can be transmitted between the switch and the VMS is limited by the capacity of the interface. Another problem is the failure of the transmission link provided by the interface. Because all messages to be processed by the VMS must be transmitted through the interface's single link, if the link fails, no messages can be delivered to the VMS. Moreover, when links fail it is often difficult to determine the cause of the failure.

Previously the problems of link failure have been solved by connecting an additional interface between the telephone switch and the VMS. The use of a second interface, however, doubles the cost of the system and the space required for housing the system. Additionally, although additional capacity is provided by the second interface, this additional capacity is often unnecessary. In many situations, the capacity provided by a single interface is sufficient to meet the demands of the system. The problem rather lies in failure of the link provided by the interface and the inability of the interface to process and translate data messages upon failure of the link.

The present invention provides an improved interface which overcomes the problems presented in the prior art and which provides additional advantages over the prior art, such advantages will become clear upon a reading of the attached specification in combination with a study of the drawings.

OBJECTS AND SUMMARY OF THE INVENTION

An object of the present invention is to provide an interface with improved performance;

Another object of the present invention is to provide an interface with improved reliability;

A further object of the present invention is to provide an interface which improves the performance and reliability of the system while minimizing the number of electrical connections between the interface and the adjunct processor; and A further object of the present invention is to provide a cost efficient interface.

Briefly, and in accordance with the foregoing, the present invention discloses an improved interface between a telephone switching system and an adjunct processor. The interface provided by the present invention allows for improved performance and reliability. The improved performance and reliability are achieved by utilizing multiple transmission links for processing data messages between the telephone switching system and the adjunct processor and by implementing unique operating software to selectively and automatically control the data transmission and retransmission of the data along the links. If one transmission link fails, all messages are processed by the remaining link or links.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 4a is an outline of the steps performed by the device driver algorithm of the interface of the present invention when processing messages in the forward direction;

FIG. 4b is an outline of the steps performed by the protocol stack algorithm of the interface of the present invention when processing messages in the forward direction;

FIG. 4c is an outline of the steps performed by the splitting task algorithm of the interface of the present invention;

FIG. 4d is an outline of the steps performed by the application task algorithm of the interface of the present invention when processing messages in the forward direction;

FIG. 4e is an outline of the steps performed by the application task algorithm of the interface of the present invention when processing messages in the reverse direction;

FIG. 4f is an outline of the steps performed by the combining task algorithm of the interface of the present invention;

FIG. 4g is an outline of the steps performed by the protocol stack algorithm of the interface of the present invention when processing data messages in the reverse direction; and FIG. 4h is an outline of the steps performed by the device driver algorithm of the interface of the present invention when processing data messages in the reverse direction.

DETAILED DESCRIPTION OF THE PREFERRED EMBODIMENT

Figure 1:
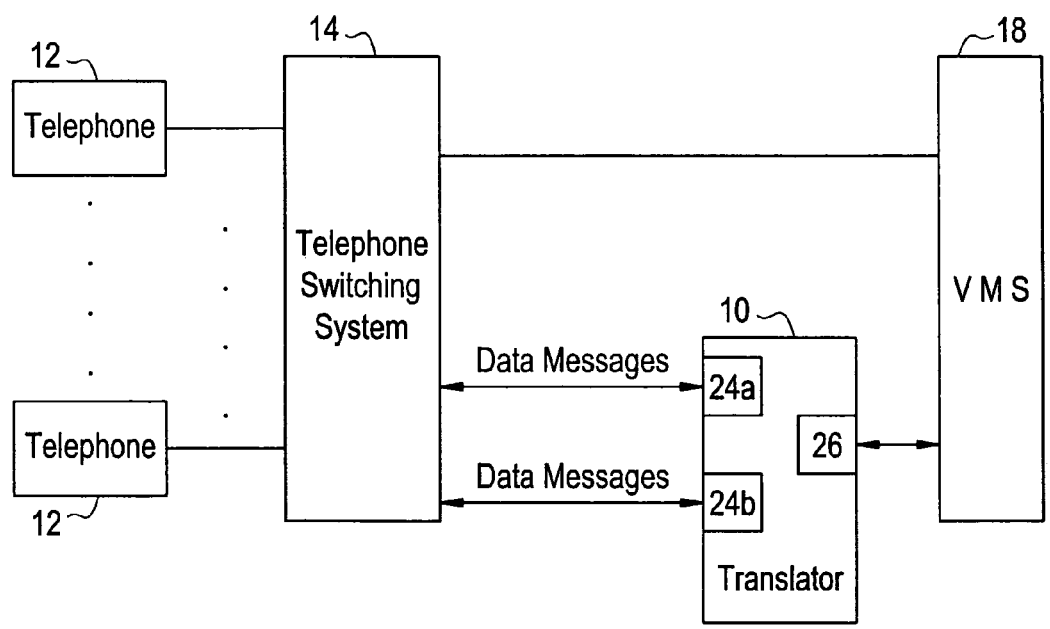
FIG. 1 is a block diagram representing a portion of a telecommunications system in which the interface of the present invention is used.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

As shown in FIG. 1, the interface 10 of the present invention is to be used in a telecommunication system. The telephone switching system 14 provides communication services for a number of telephones 12 and their users. One type of switch 14 typically used in a telecommunication system is the 5ESS switch made by Lucent Technologies, for example. The interface 10 provides a connection for the transmission of data messages from the telephone switching system 14 to the adjunct processor 18 and from the adjunct processor 18 to the telephone switching system 14. The adjunct processor 18 shown in FIG. 1 is a Voice Messaging System (VMS). Although the interface 10 of the present invention could be adapted for use with other types of adjunct processors, the interface 10 of the present invention will be shown and described in connection with a VMS.

The present invention will be described in the context of a VMS which utilizes SMSI protocol and a telephone switch which utilizes API protocol, although it is to be understood that the present invention can be used with a telephone switch and adjunct processor which utilize any protocol. Because the telephone switch 14 the VMS 18 do not utilize the same protocol, the interface 10 of the present invention provides the necessary translation.

Within the context of this description of the invention, when the interface 10 receives messages from the switch 14 and delivers the messages to the VMS 18 it is said to be operating in the forward direction. When the interface 10 receives messages from the VMS 18 and delivers the messages to the switch 14 it is said to be operating in the reverse direction. When operating in the forward direction, the interface 10 receives API protocol messages from the switch 14 and delivers the messages to the VMS 18 in SMSI protocol. When operating in the reverse direction, the interface 10 receives SMSI protocol messages from the VMS 18 and delivers the messages to the switch 14 in API protocol.

Figure 2A:
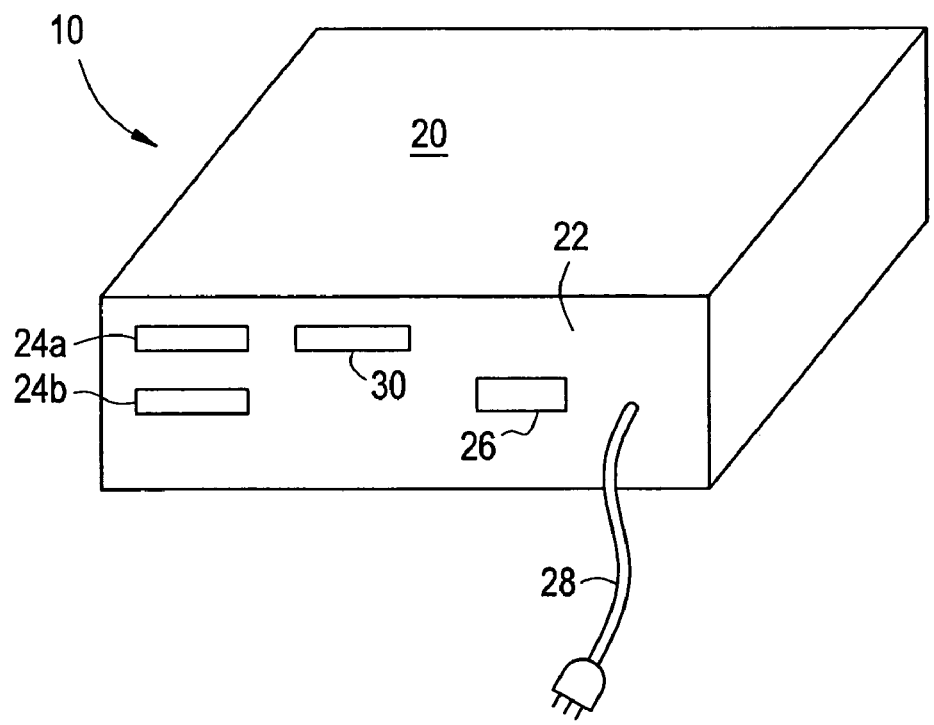
FIG. 2a is a front perspective view of an embodiment of the interface of the present invention.
Figure 2B:
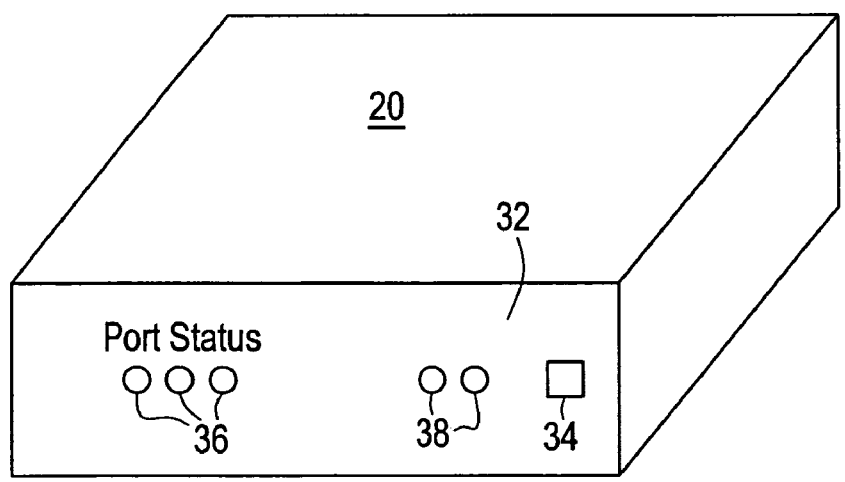
FIG. 2b is a rear perspective view of the interface of the present invention.

As shown in FIGS. 2a and 2b, the interface 10 has a generally rectangularly shaped housing 20 which houses the hardware and software components of the interface 10.

Electrical connection of the interface 10 is provided through the rear panel 22 of the housing 20. Connectors 24a, 24b provide electrical connection between the interface 10 and the switch 14. Connector 26 provides electrical connection between the interface 10 and the VMS 18. Power is supplied to the interface 10 through a power cord 28. In the preferred embodiment, an additional connector 30 is provided for allowing electrical connection of a diagnostic device.

The front panel 32 of the interface housing 20 includes several light emitting diodes (LEDs). A power LED 34 indicates whether power has been provided to the interface 10. Port status LEDs 36 provide indication of which connectors 24a, 24b 30 are in use. Link status LEDs 38 provide indication that data is being transmitted over the particular link indicated.

Figure 3:
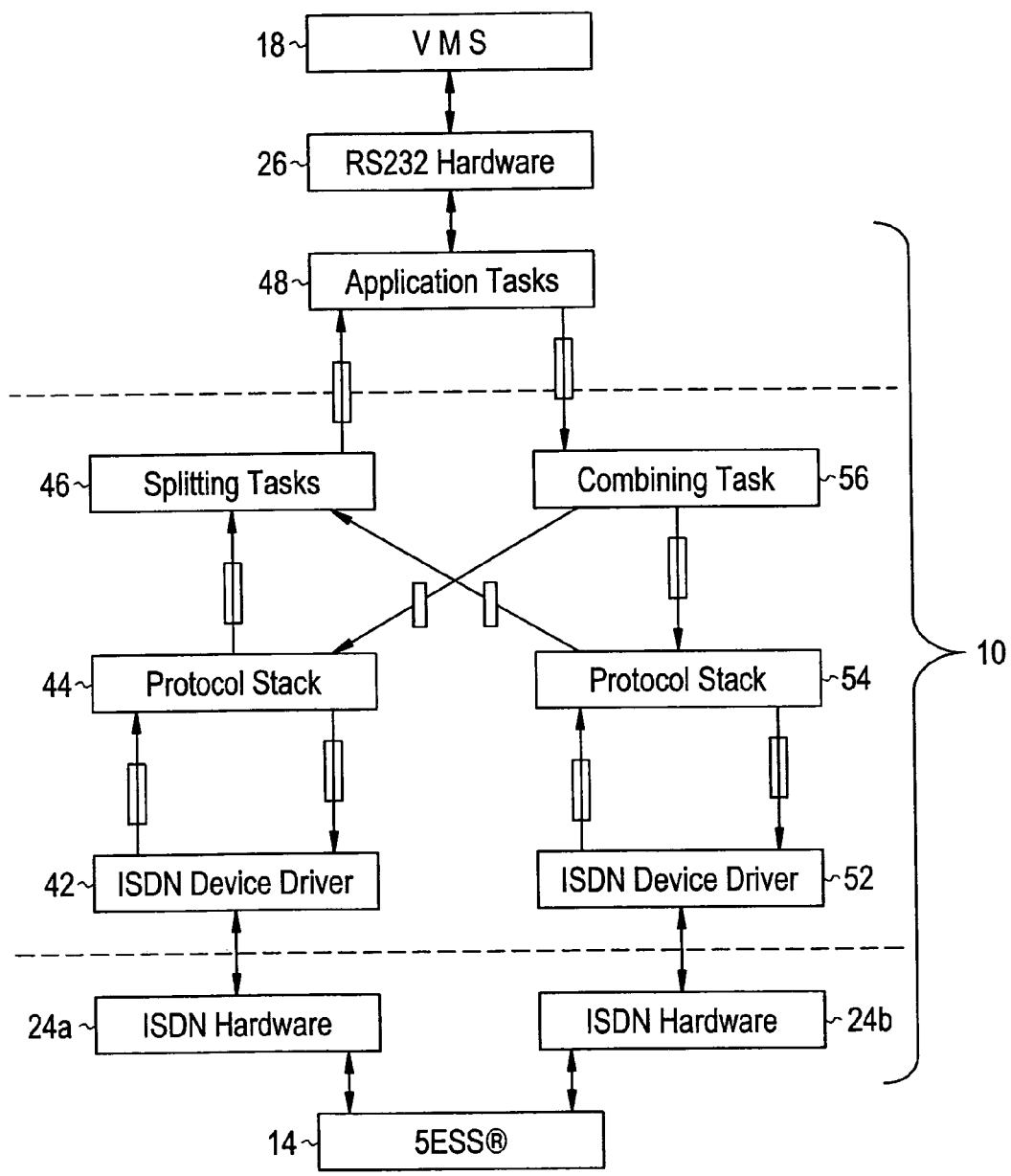
FIG. 3 is a block diagram representing the processing of messages by the interface between a telephone switch and a VMS.

FIG. 3 is a diagram which represents the hardware connections between the switch 14, the interface 10 and the VMS 18. Unlike prior art interfaces, multiple electrical connections between the interface 10 and the switch 14 are provided by, for example, the connectors 24a, 24b which allow for the processing of data messages over multiple links. The connector 26 provides connection between the interface 10 and the VMS 18.

Although it is fully contemplated that the interface can provide more than two transmission links, for purposes of clarity in explanation, the invention will be described below as including only two transmission links. The processing of the data messages by the software component of the interface 10 is also shown in FIG. 3. The diagram shows the forward flow of data messages from the switch 14 to the VMS 18 and the reverse flow of data messages from the VMS 18 to the switch 14. The software component of the interface 10 is a series of algorithms which resides in the microprocessor of the interface 10. This microprocessor is typically mounted to a circuit board which is mounted within the housing 20 of the interface 10. The microprocessor includes flash, dynamic and RAM memory. When power is delivered to the interface 10 the algorithmic software program is copied from the flash memory, to the dynamic memory and finally to the RAM where the program is executed. The interface's program is responsible for processing and translating messages between the switch 14 and the VMS 18. The software of the interface 10 is programmed such that the interface receives and processes data through two links provided by connector 24a, 24b. The software of the interface 10 is a series of algorithms/routines which process data messages between the switch 14 and the VMS 18. Each algorithm is a series of instructions which perform specific functions associated with processing the data messages.

More specifically, in the forward direction, messages packets are transmitted to the interface 10 from the switch 14 via the connectors 24a, 24b. A message packet contains data related to one or more individual messages. The message packets are processed through the two links and transmitted to the VMS 18 through the connector 26. The connectors 24a, 24b of the interface 10 are connected to the switch 14 in a customary manner, such as that provided by Lucent Technologies specification 235-900-303 which details the protocol that is being utilized, and is incorporated herein by reference.

Processing of the data messages includes several steps. The forward processing of messages from the switch 14 to the VMS 18 will first be described. On the first link provided by the interface, the message packets are transmitted from the switch 14 to a first device driver algorithm 42 through the connector 24a. The driver for the port is to be implemented in the form of an interrupt service routine and can process both B and D channel data. An intelligent ISDN controller chip such as the PEB 2086, manufactured by Siemens Semiconductors can be used for implementation of the ISDN port.

The steps performed by the device driver algorithm 42 operating in the forward direction are shown in FIG. 4a. The device driver algorithm 42 receives the data message packets, filters erroneous frames from the message packets, and forwards the message packets to the protocol stack algorithm 44.

The protocol stack algorithm 44 validates the message packets. The steps performed by the protocol stack algorithm 44 when processing data messages in the forward direction are shown in FIG. 4b. The protocol stack algorithm 44 performs three layers of validation. The first layer of validation is comprised of basic error checking. A second layer of validation confirms that the proper protocol as directed by the connector 28a has been met. The third layer of validation confirms that the proper protocol as directed by the switch 14 has been met. In the case of the 5ESS switch, the third layer of validation is to confirm that the data meets the proper API protocol. After completion of the validation by the protocol stack algorithm 44, the message packets are forwarded to the splitting task algorithm 46.

The splitting task algorithm 46 splits the message packets into individual messages. The steps performed by the splitting task algorithm 46 are shown in FIG. 4c. After splitting the message packets into individual messages, the messages are forwarded to the application task algorithm 38.

The application task algorithm 48 translates the individual messages from API protocol to SMSI protocol. The steps of the application task algorithm 48 when processing messages in the forward direction are shown in FIG. 4d. After translation, the application task algorithm 48 transmits the translated messages to the VMS 18 by way of the connector 26.

On the second link provided by the interface 10, the data messages are processed in the forward direction in the following manner. The message packets are transmitted from the switch 14 to a first device driver algorithm 52 through the connector 24b. The steps of the device driver algorithm 52 are shown in FIG. 4a. The device driver algorithm 52 receives the message packets, filters erroneous frames from the message packets, and forwards the message packets to the protocol stack algorithm 54. The protocol stack algorithm 54 validates the message packets. The steps performed by the protocol stack algorithm 54 is shown in FIG. 4b. The protocol stack algorithm 54 performs three layers of validation in the same manner as the protocol stack algorithm 44. After completion of the validation by the protocol stack algorithm 54, the message packets are forwarded to the splitting task algorithm 46.

The splitting task algorithm 46 splits the message packets into individual messages. The steps of the splitting task algorithm are shown in FIG. 4c. After splitting the message packets into individual messages, the messages are transmitted to the application task algorithm 48.

The application task algorithm 48 translates the individual messages from API protocol to SMSI protocol. The steps of the application task algorithm are shown in FIG. 6. After translation, the application task algorithm 38 transmits the translated messages to the VMS 18 by way of the connector 30.

In the reverse direction the interface 10 transmits individual data messages from the VMS 18 to the interface 10. The data messages are processed in the following manner.

Individual messages are transmitted from the VMS 18 to the application task algorithm 38 through the connector 30. The application task algorithm translates the individual SMSI protocol messages into individual API protocol messages and forwards the messages to the combining task algorithm 56. The steps performed by the application task algorithm when processing messages in the reverse direction are shown in FIG. 4e.

The combining task algorithm 56 combines individual API protocol messages into API protocol message packets and forwards the message packets to the protocol stack algorithms 34, 44. The combining task algorithm 46 alternates delivery of message packets between the two protocol stack algorithms 44, 54. The steps performed by the combining task algorithm 56 are shown in FIG. 4f.

The protocol stack algorithm 44 receives the message packets from the combining task algorithm 56 and validates the message packet. The protocol stack algorithm 54 receives the message packets from the combining task algorithm 56 and validates the message packets. The steps performed by the protocol stack algorithms 44, 54 in the reverse direction is shown in FIG. 4g.

Additional visual representations of the context and queue of each of the key tasks performed by the interface of the present invention are shown in Appendix A.

After validation, the protocol stack algorithm 44 transmits the message packets to the device driver algorithm 42 and the protocol stack algorithm 54 transmits the message packets to the device driver algorithm 52. The device driver algorithm 42 transmits the message packets to the switch 14 through the connector 24a and the device driver algorithm 52 transmits the message packets to the switch 14 through the connector 24b. The steps performed by the device driver algorithms 42, 52 when processing messages in the reverse direction are shown in FIG. 4h.

Thus, in the two-link interface described a first link is formed by the connector 28a, the device driver algorithm 42, protocol stack algorithm 44, the splitting task algorithm 46, the application task algorithm 48, and the connector 26. A second link is formed by the connector 24b, the device driver algorithm 52, the protocol stack algorithm 54, the splitting task 46, the application task 48 and the connector 48. With the addition of the second link, the interface 10 provides improved performance in that the transmission of the data is divided between each of the two links. The addition of a second link also improves the interface reliability. In the event that the first link fails, all data messages are processed by the interface through the second link. Likewise, if the second link fails, all messages are processed by the interface through the first link. Unlike the prior art, the interface of the present invention can continue to operate in the event of link failure. By providing multiple links within the interface 10, for processing data between the switch 14 and the VMS 18, the reliability of the interface is improved without unnecessarily increasing the cost and capacity of the interface.

The improved performance of the interface of the present invention is achieved without increasing the rack space occupied by the interface. The additional connector needed to provide a two link interface can be added to rear panel 22 of the panel housing 20 without increasing the size of the panel. The additional software needed to provide a two link interface can be accommodated on the existing circuit board within the housing 20.

If two prior art interfaces were used in an attempt to improve reliability and performance, three additional electrical connections would be needed. An additional connection would be needed between the switch 14 and the second interface, between the second interface and the VMS, and to power the second interface. The use of a two link interface however, requires only one additional electrical connection between the switch 14 and the interface 10.

As noted above, although the interface of the present invention has been shown and described as having two links, the interface 10 could be constructed with more than two links. For example, three connectors could be provided between the switch 14 and the interface 10, thus providing three links. In a three link interface, three device drivers and three protocol stacks would also be provided. The splitting task algorithm would receive data messages from three protocol stacks and would deliver these messages to the application task algorithm 48 for translation. When operating in the reverse direction, the combining task of a three link interface would deliver the message packets to three protocol stacks in an alternating fashion. In the event of a link failure in a three link interface, the remaining two links would continue to process the data messages. Additionally, if two of the three links failed, the remaining link would be available to process and translate the data messages.

While preferred embodiments of the present invention are shown and described, it is envisioned that those skilled in the art may devise various modifications of the present invention without departing from the spirit and scope of the appended claims.

What is claimed is:

1. An interfacing method for processing data between a telephone switching system and an adjunct processor and for translating data message protocol comprising the steps of:

providing interface hardware including first and second connectors for connecting the interface to the telephone switching system and a third connector for connecting the interface to the adjunct processor;

transmitting the data massages between the telephone switching system and the adjunct processor using at least two transmission links in an alternating fashion;

grouping the data messages in a first protocol into data massage sets;

transmitting a first data message set from the telephone switching system through a first port to a first device driver algorithm;

transmitting a second data message set from the telephone switching system trough a second port to a second device driver algorithm;

transmitting the first data message set from the first device driver algorithm to a first protocol stack algorithm;

transmitting the second data message set from said second device driver algorithm to a second protocol stack algorithm;

transmitting the first data message set from said first protocol stack algorithm to a splitting task algorithm;

transmitting the second data message set from said second protocol stack algorithm to said splitting task algorithm;

splitting the first data message set and the second data message set into data message subsets;

transmitting the data message subsets an application task;

translating the data message subsets into said second protocol; and transmitting the data message subsets to the adjunct processor.

2. A method as defined in claim 1, further comprising the steps of:

receiving the data message subsets from the adjunct processor;

translating the data message subsets from said second protocol to said first protocol;

combining the data messages subsets into data message sets;

transmitting a first data message set to said first protocol stack algorithm;

transmitting a second message set to said second protocol stack algorithm;

transmitting said first data message set to said first device driver algorithm;

transmitting said second data message set to said second device driver algorithm;

transmitting said first data message set to the telephone switching system; and transmitting said second data message set to the telephone switching system.

* * * * *